United States Patent
Neveu et al.

(10) Patent No.: US 12,341,422 B2
(45) Date of Patent: Jun. 24, 2025

(54) DC-DC CONVERTER TOPOLOGY WITH SWITCHING OVERCURRENT PROTECTION

(71) Applicant: TEXAS INSTRUMENTS INCORPORATED, Dallas, TX (US)

(72) Inventors: Florian Neveu, Freising (BY); Stefan Schimonsky, Munich (DE); Joerg Kirchner, Mauern (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 258 days.

(21) Appl. No.: 18/309,001

(22) Filed: Apr. 28, 2023

(65) Prior Publication Data
US 2024/0364210 A1    Oct. 31, 2024

(51) Int. Cl.
*H02M 1/32* (2007.01)
*H02M 1/00* (2006.01)
*H02M 3/157* (2006.01)
*H02M 3/158* (2006.01)

(52) U.S. Cl.
CPC .......... *H02M 1/32* (2013.01); *H02M 1/0009* (2021.05); *H02M 3/157* (2013.01); *H02M 3/1582* (2013.01)

(58) Field of Classification Search
CPC ...... H02M 1/32; H02M 1/0009; H02M 3/157; H02M 3/1582
See application file for complete search history.

(56) References Cited

U.S. PATENT DOCUMENTS

| 10,135,340 | B1 | 11/2018 | Megaw | |
| 11,527,957 | B2* | 12/2022 | Karri | H02M 3/1582 |
| 11,791,715 | B2* | 10/2023 | Katakam | H02M 3/1566 |
| | | | | 363/16 |
| 2014/0225577 | A1* | 8/2014 | Ivanov | H02M 3/1582 |
| | | | | 323/225 |
| 2017/0155324 | A1* | 6/2017 | Choquet | H02M 3/1582 |
| 2020/0064893 | A1* | 2/2020 | Kirchner | H02M 3/07 |

OTHER PUBLICATIONS

Charles E. Mullett, "Biomodal DC-DC Converter With an Efficient Pass-Through Zone", Published 2005.
Power By Linear, "100V Vin and Vout Synchoronous 4-Switch Buck-Boost DC/DC Controller with Pass-Thru", Published 2019-2020.

* cited by examiner

*Primary Examiner* — Rafael O De Leon Domenech
(74) *Attorney, Agent, or Firm* — Valerie M. Davis; Frank D. Cimino (57) ABSTRACT

The techniques and circuits, described herein, include solutions for pass-through operation including overcurrent protection in buck-boost converters. In some aspects, first and second switches selectively couple inputs of a peak current comparator to inputs of an error amplifier during pass-through operation. As part of peak current control scheme, one of the peak current comparator inputs is coupled to a current sensor that senses a current through an inductor of the buck-boost converter. As a result, an output of the error amplifier tracks the inductor current during pass-through mode, which may be utilized to implement inductor overcurrent protection in the pass-through mode.

20 Claims, 5 Drawing Sheets

DC-DC CONVERTER TOPOLOGY WITH SWITCHING OVERCURRENT PROTECTION

BACKGROUND

Direct current (DC)-to-DC converters are widely employed in devices of today to perform power conversion. Generally, power converters receive an input voltage from a power source, such as a battery, and provide a regulated output voltage at one or more voltage levels. For example, buck converters, boost converters, and buck-boost converters are three basic types of power converter technologies. In a buck converter, the output voltage is less than the input voltage; while in a boost converter, the output voltage is greater than the input voltage.

SUMMARY

In one example, a DC-to-DC converter includes an input terminal, an output terminal, and a current path extending from the input terminal to the output terminal. An input voltage monitoring circuit has an input voltage monitoring circuit input, an upper input voltage threshold terminal, a lower input voltage threshold terminal, and a voltage reference output. The input voltage monitoring circuit input is coupled to the input terminal. A controller has a feedback input, a reference input, and a plurality of switching outputs. The feedback input is coupled to the output terminal and the reference input is coupled to the voltage reference output of the input voltage monitoring circuit. A current sensor has a current sensor input arranged on the current path and a current sensor output. A current comparison circuit has a first current comparison input, a second current comparison input, and a current comparison output. The first current comparison input is coupled to the current sensor output, the second current comparison input is coupled to a current threshold terminal, and the current comparison output is coupled to the controller.

In another example, a circuit includes a first voltage input terminal, a second voltage input terminal, a first control input terminal, and a signal output terminal. A first switch has a first input coupled to the first voltage input terminal, a second input, an output, and a control terminal coupled to the first control input terminal. A second switch has a first input coupled to the second voltage input terminal, a second input, an output, and a control terminal coupled to the first control input terminal. An error amplifier has a first input coupled to the output of the first switch, a second input coupled to the output of the second switch, and an output coupled to the signal output terminal. A peak current comparator has a first input, a second input coupled to the output of the error amplifier, and an output. The second input of the first switch is coupled to the first input of the peak current comparator, and the second input of the second switch is coupled to the second input of the peak current comparator.

In another example, a circuit includes a first voltage input terminal, a second voltage input terminal, a third voltage input terminal, and a first voltage output terminal. A first resistor is coupled between the third voltage input terminal and the first voltage output terminal. A first comparator has a first input coupled to the first voltage input terminal, a second input coupled to the third voltage input terminal, and an output. Current sourcing circuitry has a control input coupled to the output of the first comparator, and a current sourcing output coupled to the third voltage input terminal. A second comparator has a first input coupled to the third voltage input terminal, a second input coupled to the second voltage input terminal, and an output. Current sinking circuitry has a control input coupled to the output of the second comparator, and a current sinking input coupled to the third voltage input terminal. Logic circuitry has a first input coupled to the output of the first comparator, a second input coupled to the output of the second comparator, and a within-range output.

DETAILED DESCRIPTION

The drawings are not drawn to scale.

Direct current (DC) to DC converters are utilized in a wide variety of electronic circuits due to their ability to receive an input DC voltage, and step-up and/or step-down that input DC voltage to provide an output voltage DC.

Figure 1:
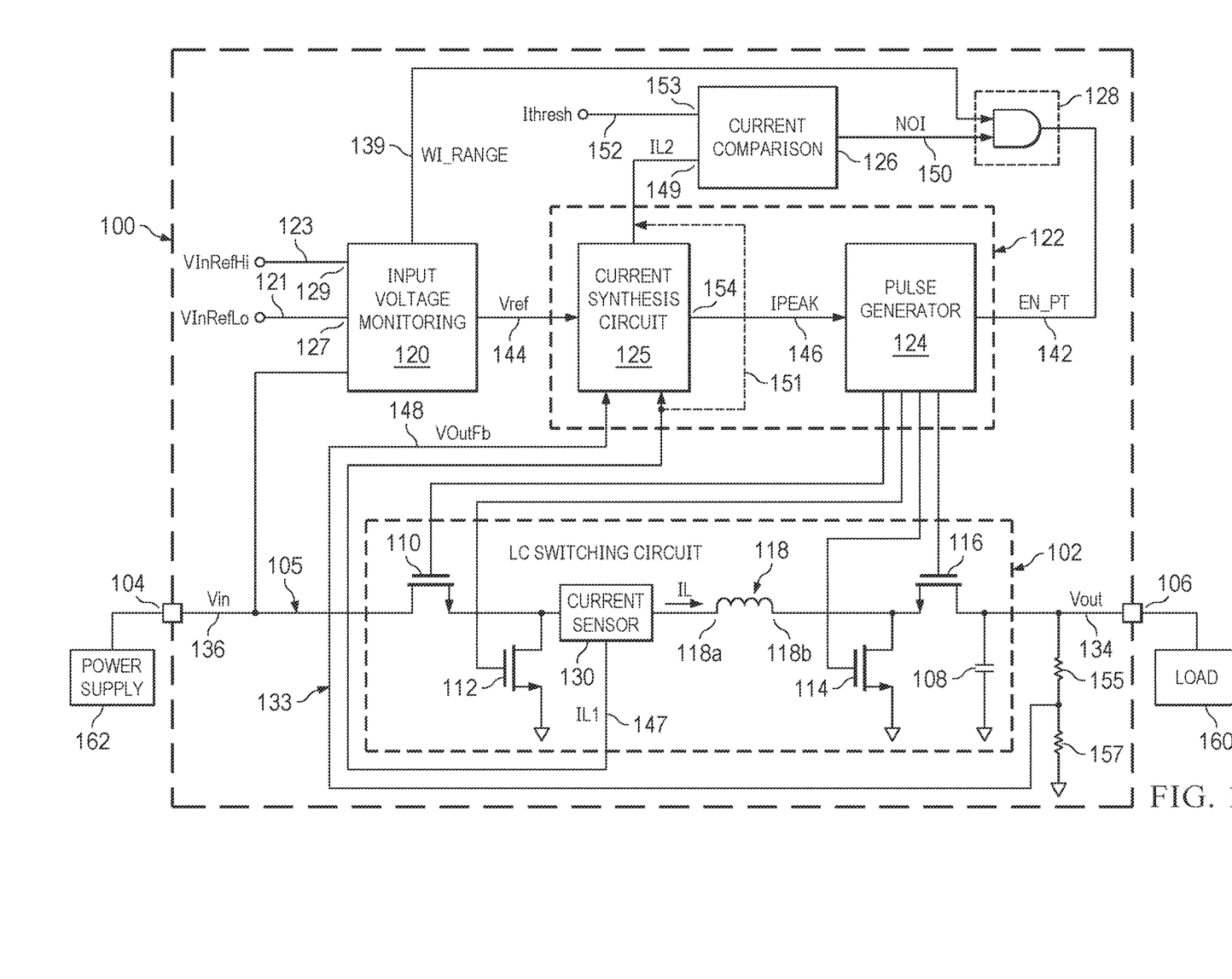
FIG. 1 is a circuit schematic including a DC-to-DC converter which has a pass-through mode with overcurrent protection in accordance with some aspects of the present disclosure.

FIG. 1 illustrates one example of a DC-to-DC converter 100 which has a pass-through mode with overcurrent protection in accordance with some aspects of the disclosure. The DC-to-DC converter 100 comprises an input terminal 104 (which can be coupled to a power supply 162, such as a battery for example) and an output terminal 106 (which can be coupled to a load 160, such as an integrated circuit, automotive component, or other electronic device, for example). A current path 105 extends from the input terminal 104 to the output terminal 106. An inductor-capacitor (LC) switching circuit 102 is included on the current path 105. In the example of FIG. 1, the LC switching circuit 102 includes a capacitor 108 and an inductor 118, as well as switches 110, 112, 114, and 116.

An input voltage monitoring circuit 120, controller 122, current comparison circuit 126, and logic circuit 128 (illustrated in the example of FIG. 1 as a logical-AND gate), are operably coupled as shown. The controller 122 can include a current synthesis circuit 125 and a pulse generator 124. The controller 122 has a feedback input, which is coupled to the output terminal 106 via feedback path 133, and a controller output coupled to control terminals of the switches 110-116. Resistors 155, 157 are coupled to output terminal 106 and feedback path 133. The controller 122 and LC switching circuit 102 operate in a closed loop mode of operation to regulate an output voltage Vout 134 on output terminal 106 based on an input voltage Vin 136 on input terminal 104.

During operation, so long as Vin 136 resides within a predetermined (acceptable) voltage range, the DC-to-DC converter 100 "passes" Vin 136 from input terminal 104 "through" to the output terminal 106, such that Vout 134 equals Vin 136 (minus any losses over the current path 105, wherein losses at Vout 134 are often less than 1% of Vin 136). The predetermined voltage range is defined between a lower input reference voltage (VInRefLo 121) and an upper input reference voltage (VInRefHi 123), which are received on lower and upper input voltage threshold terminals 127 and 129, respectively, of input voltage monitoring circuit 120. More particularly, when Vin 136 is within the predetermined input voltage range, the input voltage monitoring circuit 120 outputs a target/reference output voltage Vref 144 to controller 122, such that Vref 144 has a voltage level that tracks the voltage level of Vin 136. Input voltage monitoring circuit 120 also activates a within-range signal (WI_RANGE 139) when Vin 136 is within the predetermined range. Assuming there is no overcurrent condition at this time (e.g., not overcurrent (NOI) signal 150, which is discussed further below, is activated), activation of WI_RANGE 139 also activates enable-pass-through signal (EN_PT 142). Upon detecting that EN_PT 142 activated, the pulse generator 124 sets the switches 110-116 to directly pass Vin from the input terminal 104 to the output terminal 106 (e.g., switches 110 and 116 are continuously closed and 112 and 114 are continuously open without high-frequency switching operations in LC switching circuit 102).

When Vin 136 starts to "dip" below the predetermined voltage range (e.g., below VInRefLo 121), the input voltage monitoring circuit 120 deactivates WI_RANGE 139, and clamps Vref 144 to VInRefLo 121. The controller 122 (making use of feedback path 133) controls the switches 110-116 to drive Vout 134 up to Vref 144 (and hence, up to VInRefLo 121). Thus, when Vin "dips" below the predetermined voltage range, the controller 122 controls the switches 110-116 such that Vin impingent on LC switching circuit 102 is "boosted" up so the output voltage Vout 134 is driven within the predetermined voltage range.

Conversely, when the input voltage Vin 136 starts to "rise" above the predetermined voltage range (e.g., above VInRefHi 123), the input voltage monitoring circuit 120 again deactivates WI_RANGE 139, and now clamps Vref 144 to VInRefHi 123. The controller 122 (making use of feedback path 133) controls the switches 110-116 to drive Vout 134 down to Vref 144 (and hence, down to VInRefHi 123). Thus, when Vin "rises" above the predetermined voltage range, the controller 122 controls the switches 110-116 such that Vin impingent on LC switching circuit 102 is "bucked" down so the output voltage Vout 134 is driven within the predetermined voltage range.

In this way, the DC-to-DC converter 100 can change between a "pass-through" non-switching mode (e.g., when Vin is within the predetermined range), a "boost" switching mode (e.g., when Vin is below the predetermined range), and a "buck" switching mode (e.g., when Vin is above the predetermined range) to regulate Vout 134 based on Vin 136. Vout 134 is regulated such that Vout 134 generally remains within the predetermined voltage range, even over changes in power provided by the power supply 162 and/or changes in power demands of load 160. Because the "pass through" mode operates in a non-switching mode (e.g., when switches 110-116 are in a static state with 110,116 continuously closed and 112,114 continuously open), the pass-through mode limits power losses, compared to continuous switching modes (e.g. "boost" and "buck" switching modes when 110-116 are rapidly switched on an off). Therefore, this DC-to-DC converter 100 with pass through mode offers a reliable/stable output voltage while still maintaining a relatively high efficiency.

Some aspects of the present disclosure lie in the appreciation that although "pass-through" non-switching mode is advantageous because it limits power losses compared to the "boost" and "buck" switching modes, "pass-though" mode could also make the DC-to-DC converter 100 potentially susceptible to damage arising from a short circuit or other overcurrent condition, absent sufficient safeguards. For example, in some cases, in the event of a large and sudden in-rush of current entering the input terminal 104, the large in-rush of current could pass over the inductor 118 and switches 110, 116 during pass through mode. If the in-rush of current is sufficiently large, the inductor 118 may become saturated (e.g., unable to store more energy), which results in a short circuit along the current path 105 due to the inductor no longer resisting current flow. The short circuit could cause significant overheating that could damage the DC-to-DC converter 100 and/or even render it inoperable.

Therefore, to limit potential damage from such overcurrent conditions, FIG. 1's DC-to-DC converter 100 includes a current sensor 130 that measures the current passing though the current path 105 between the input terminal 104 and output terminal 106. The current sensor 130 has a current sensor input arranged on the current path 105 and a current sensor output coupled to the current comparison circuit 126. The current comparison circuit 126 has a first current comparison input, a second current comparison input, and a current comparison output. The first current comparison input is coupled to the current sensor output of the current sensor 130. The second current comparison input is coupled to a current threshold terminal 153 on which a current threshold signal 152 is received. An output of the current comparison circuit 126 is coupled to the controller 122, for example though the logic circuit 128. In some instances, the current sensor 130 measures current through the inductor 118. The location of the current sensor 130 could be different than illustrated, for example it can be to the left or right of the inductor 118, or could even be left/right of switch 110 or left/right of switch 116. The location of the current sensor 130 may impact the type of control used outside of pass-through, but generally doesn't impact the pass-through mechanism as long as the current sensed during pass-through is the inductor current.

The current sensor 130 provides a first current measurement signal 147 to the controller 122. Based on the first current measurement signal 147, the controller 122 provides a second current measurement signal 149 to the current comparison circuit 126. In an alternative embodiment, the current sensor 130 can provide the first current measurement signal 147 directly to the current comparison circuit 126 (see path 151). When the current comparison circuit 126 determines the first and/or second current measurement signal is greater than a predetermined current threshold (Ithresh 152), the current comparison circuit 126 changes the state of NOI signal 150. In response to de-activation of NOI signal 150, the logic circuit 128 notifies the pulse generator 124 of the overcurrent condition so the pulse generator 124 can take corrective action. For example, in the wake of a sudden in-rush of current that exceeds the predetermined current threshold 152, the logic circuit 128 de-activates the EN_PT signal 142 based on WI_Range 139 and NOI 150, and thus the pulse generator 124 can enable switching for a fixed predetermined time and/or so long as the EN_PT signal 142 is in the de-activated with WI_RANGE activated. In this way, this overcurrent switching mode can route the excess current to ground, thereby protecting devices at the output terminal 106.

Although FIG. 1 shows an example DC-to-DC converter 100, it will be appreciated that this overcurrent protection techniques of the present disclosure are also applicable to numerous other DC-to-DC converter topologies. Thus, the LC switching circuit 102 of FIG. 1 can be replaced with other types of LC switching circuits to achieve a buck converter, a boost converter, or the like. For example, the LC switching circuit 102 of FIG. 1 includes first switch 110, second switch 116, third switch 112, and fourth switch 114. The first switch 110 has a first current terminal and a second current terminal that are arranged on the current path 105, and a first control terminal. The first current terminal is coupled to the input terminal 104, and the second current terminal is coupled to a first inductor terminal 118a. The second switch 116 has a third current terminal and a fourth current terminal that are arranged on the current path, and a second control terminal. The third current terminal is coupled to a second inductor terminal 118b, and the fourth current terminal is coupled to the output terminal 106. The third switch 112 has a fifth current terminal, a sixth current terminal, and a third control terminal. The fifth current terminal is coupled to the current path and the sixth current terminal is coupled to ground. The fourth switch 114 has a seventh current terminal, an eighth current terminal, and a fourth control terminal. The seventh current terminal is coupled to the current path and the eighth current terminal is coupled to ground. Although switches are used in the present example, in other examples, one or more of the switches are replaced by other types of PN junction devices. For example, the switch 112 may be replaced by a diode, where an anode of the diode is coupled to ground and a cathode of the diode is coupled to the second current terminal of the first switch 110. As another example, the switch 116 may be replaced by a diode, where an anode of the diode is coupled to the second inductor terminal 118b and a cathode of the diode is coupled to the output terminal 106.

In some cases, some or all components of the DC-to-DC converter 100 are disposed in hardware, and can be disposed on one or more semiconductor substrates. For instance, in typical cases, the pulse generator 124, the input voltage monitoring circuit 120, the current comparison circuit 126, and the current sensor 130 are included on a single integrated circuit. The inductor 118, capacitor 108, and switches 110-116 can also be included on the single integrated circuit in some cases, but the inductor 118, capacitor 108, and switches 110-116 may alternatively be external components coupled to pins of the integrated circuit. For example, the single integrated circuit can include terminals of inductor (e.g., 118a, 118b) and terminals of capacitor (108) as pins on the integrated circuit, and the current path 105 can be "open" over these terminals. Furthermore, the single integrated circuit can include control terminals of the switches 110-116 as pins in order to control operation of the switches 110-116 as previously described. In some cases, the current sensor 130 is partly included on the single integrated circuit. For example, the single integrated circuit may include a current sensing amplifier having inputs as pins. The pins may be coupled to a current sensing resistor (see e.g., current sensing resistor 412 in FIG. 4B) that is arranged in series with the inductor 118, where the current sensing resistor is an external component. In some cases, the pulse generator 124 is formed as custom logic circuitry on the integrated circuit and is pure hardware, while in other cases the pulse generator 124 can be implemented as a microcontroller that executes software instructions to move through various states to act on the various signals received by the pulse generator 124, and provides appropriate control signals to the switches 110-116 based on the received signals.

Figure 2:
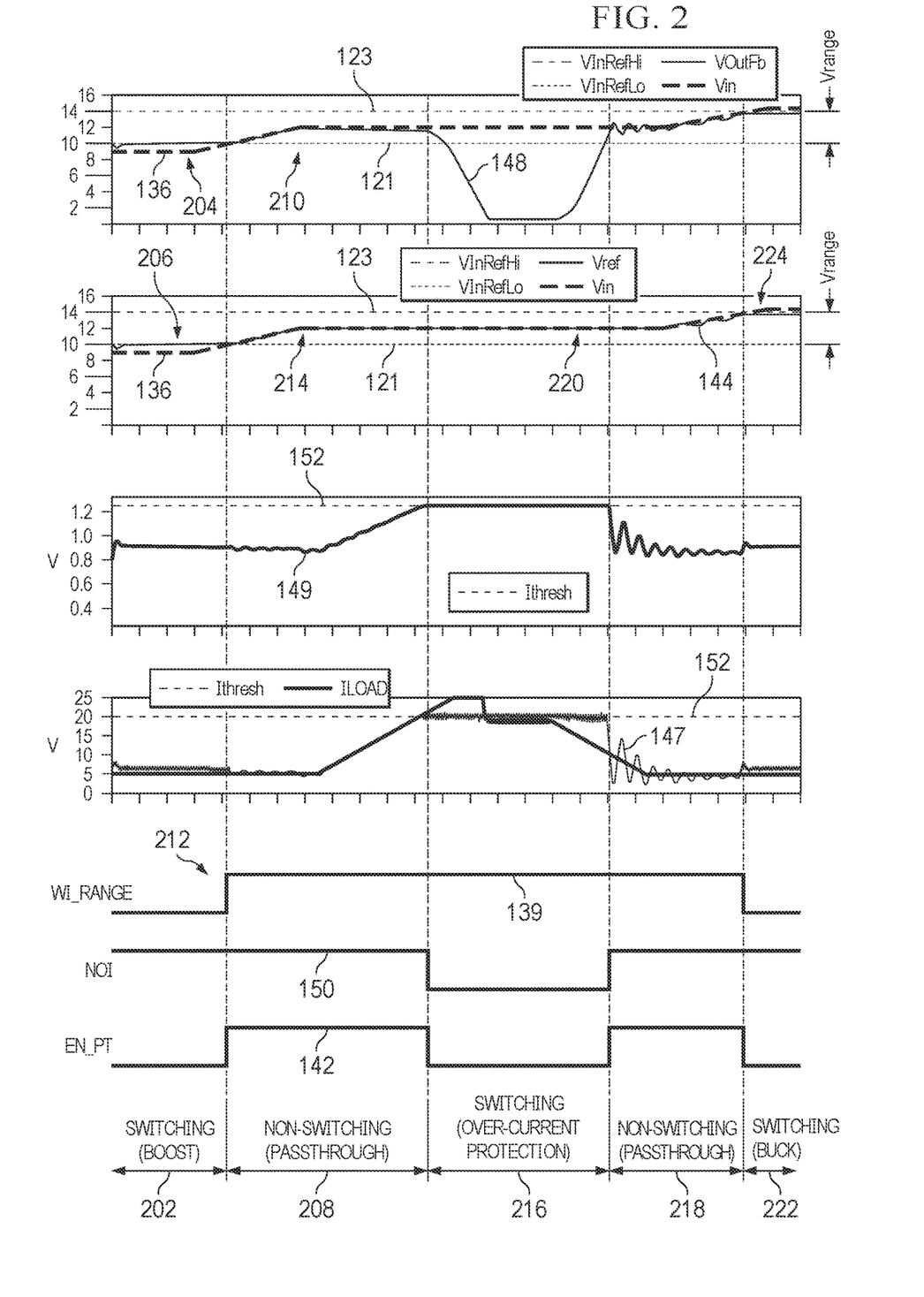
FIG. 2 is an example waveform diagram for a DC-to-DC converter transitioning between switching and non-switching operation while using overcurrent protection in accordance with some aspects of the present disclosure.

FIG. 2 is an example waveform diagram for a DC-to-DC converter transitioning between switching and non-switching operation while using overcurrent protection in accordance with some aspects of the present disclosure. The waveform diagram is now described with respect to an example DC-to-DC converter consistent with FIG. 1.

The waveform diagram begins at 202, which illustrates a "boost" switching mode. During time 202, Vin 136 is below a lower threshold voltage (VInRefLo 121) of the predetermined voltage range (see 204). Thus, the input voltage monitoring circuit 120 of FIG. 1 clamps Vref 144 to VInRefLo 121 (see 206), and because Vin falls outside of the predetermined voltage range, WI_RANGE 139 is de-activated during time 202. Because WI_RANGE 139 is de-activated, the controller 122 controls the switches 110-116 to drive Vout 134 up to Vref (which is equal to VInRefLo 121 during time 202). In this way, during time 202, the controller 122 controls the switches 110-116 to "boost" the input voltage Vin 206 to drive the output voltage Vout 134 back into the predetermined voltage range.

During time 208, which illustrates a "pass-through" non-switching mode, Vin now resides within the predetermined voltage range (e.g., Vin 136 resides between VInRefLo 121 and VInRefHi 123)—see 210. Further, Vref 144 tracks Vin 136 (see 214). As such, the input voltage monitoring circuit 120 of FIG. 1 activates WI_range (see 212) and generates Vref 144 to be substantially equal to Vin 136. Because there is no overcurrent condition detected during 204 (e.g., NOI 150 is high during 208), the logic circuit 128 activates EN_PT 142 based on WI_RANGE 139. Accordingly, based on EN_PT 142 being activated (e.g., high), the controller 122 closes switches 110, 116 while switches 112, 114 are open, and Vin 136 is "passed through" to the output terminal to establish Vout 134. Thus, during 208, Vout tracks Vin, and in particular, Vin rises from about 10 volts to about 12 volts in this example.

During time 216 in FIG. 2, an overcurrent condition is detected. This occurs when the measured first current signal 147 briefly exceeds the predetermined current threshold 152. Alternatively, a second, synthesized current signal 149 could exceed the predetermined current threshold 152. In response, NOI signal 150 is driven to the de-activated state. Because WI_Range 139 and NOI 150 are not both active, the logic circuit (e.g., AND) 128 briefly de-activates EN_PT 142. In response to EN_PT 142 being de-activated, the controller 122 enables switching (as needed) to dissipate the excess current (e.g., via "buck" mode) during time 216. As a result, the first current signal 147 (corresponding to inductor current) maintains a value around 20 amps during the time 216. The value (e.g., 20 amps) may be chosen as less than a saturation current of the inductor 118 in order to prevent short circuit faults. This switching is evidenced by ripples in the measured current signal 147 and dip in Vout 134 during 216.

At time 218, once the overcurrent condition has dissipated, NOI 150 is again deactivated. Because Vin is still within the predetermined voltage range during 218, the DC-to-DC converter again enters non-switching pass-through mode, and Vref 144 tracks Vin 136 (see 220). Consequently, the controller 122 closes switches 110 and 116 to "pass through" Vin to Vout.

During time 222, which illustrates a "buck" switching mode, Vin now rises above the predetermined voltage range (e.g., above VInRefHi 123). Thus, the input voltage monitoring circuit 120 again deactivates WI_RANGE 139, but now clamps Vref 144 to VInRefHi 123 (see 224). Thus, the controller 122 (making use of feedback path 133) controls the switches 110-116 to drive Vout 134 down to VInRefHi 123. In this way, during time 222, controller 122 controls the switches 110-116 to "buck" the input voltage Vin 136 to drive output voltage Vout 134 down back into the predetermined voltage range. In this way, the DC-to-DC converter 100 can change between a "boost" switching mode (time 202), a "pass-through" non-switching mode (times 208, 218), a "buck" switching mode (time 222), and an overcurrent protection switching mode (time 216) to regulate Vin 136 and provide a regulated Vout 134 within a pre-determined voltage range.

Figure 3:
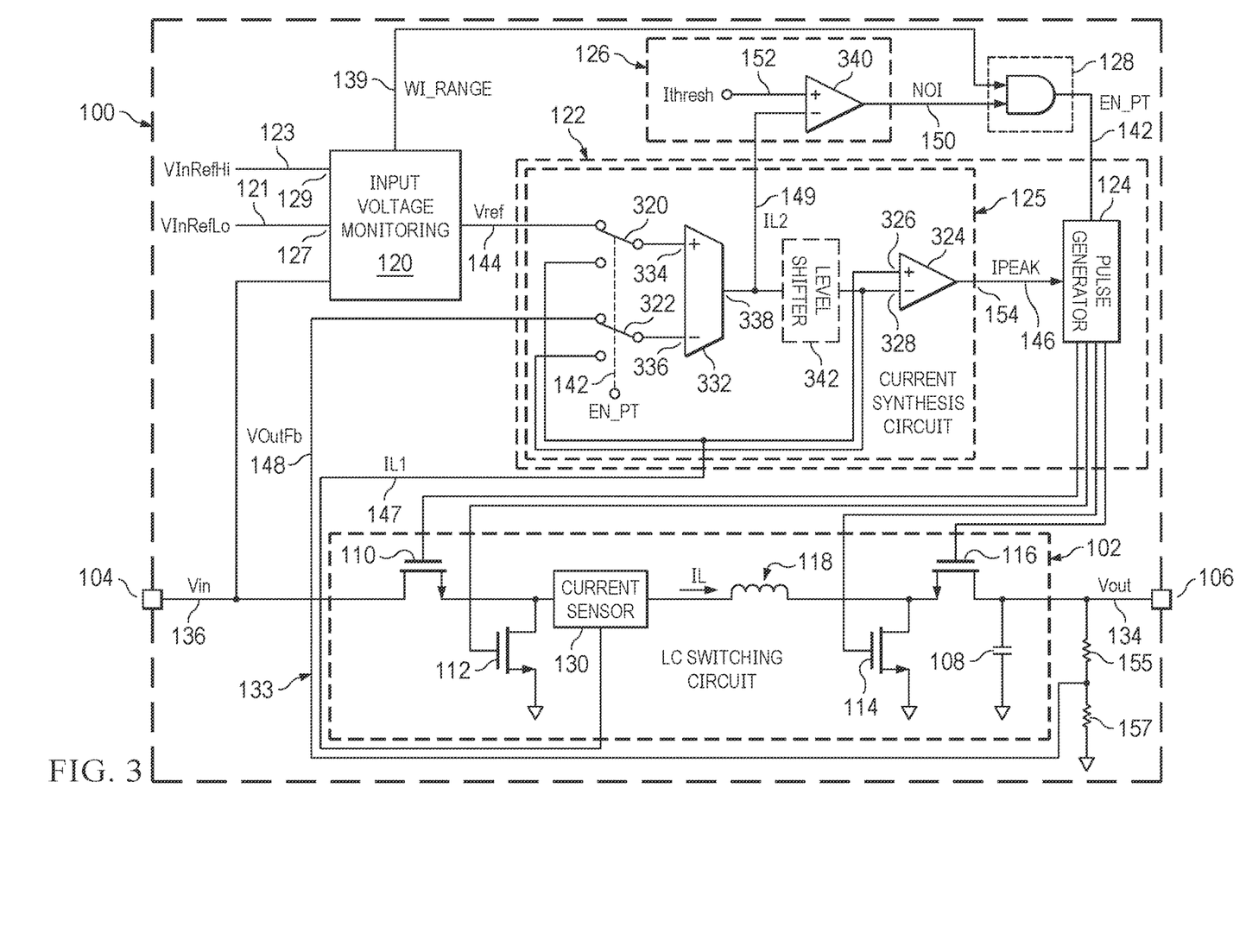
FIG. 3 is a circuit schematic including a DC-to-DC converter which has a pass-through mode with overcurrent protection in accordance with some aspects of the present disclosure.

FIG. 3 illustrates an example DC-to-DC converter including further details of the buck-boost converter 100 of FIG. 1. Similar to FIG. 1, the buck-boost converter 100 of FIG. 3 comprises an LC switching circuit 102, input voltage monitoring circuit 120, controller 122, current comparison circuit 126, and logic block 128 that are operably coupled as shown. Again, the controller 122 comprises a current synthesis circuit 125 and a pulse generator 124.

In order to achieve overcurrent protection during both switching and non-switching operation, the current synthesis circuit 125 includes a first switch 320, a second switch 322, and a peak current comparator 324. The peak current comparator comprises a first input 326, a second input 328, and an output coupled to a peak current control output terminal 154 upon which the signal IPEAK 146 is provided. The first input 326 of the peak current comparator is coupled to an output of the current sensor 130.

The current synthesis circuit 125 further comprises an error amplifier 332. The error amplifier 332 comprises a first input 334, a second input 336, and an output 338. The first input 334 of the error amplifier 332 is coupled to an output of the first switch 320 and the second input 336 of the error amplifier 332 is coupled to an output of the second switch 322. The output 338 of the error amplifier 332 provides the signal IL2 149, and is coupled to the second input 328 of the peak current comparator 324. Optionally, the output 338 is coupled to the second input 328 via a level shifter 342, which may be configured to perform level shifting (e.g., voltage shifting up/down) between the error amplifier 332 and the peak current comparator 324. In some aspects, the output 338 is coupled to a signal output terminal.

The first switch 320 has a first input coupled to a first voltage input terminal which receives the signal Vref 144, and a second input coupled to the first input 326 of the peak current comparator 324. In some examples, the first voltage input terminal is referred to as a reference voltage input terminal. The second switch 322 has a first input coupled to a second voltage input terminal which receives a signal VOutFb 148, and a second input coupled to the second input 328 of the peak current comparator 324. In some examples, the second voltage input terminal is referred to as a feedback voltage input terminal. A control terminal of the first switch 320 and a control terminal of the second switch 322 are coupled to (e.g., and controlled by) a first control input terminal which receives the signal EN_PT 142.

During switching operation, the passthrough enable signal EN_PT 142 is low. As a result, the first switch 320 and the second switch 322 couple Vref 144 and VOutFb 148 to the first and second inputs 334, 336 of the error amplifier 332 respectively. The output 338 of the error amplifier 332 (optionally level shifted via the level shifter 342) provides a peak current threshold value (represented as a voltage) to the second input 328 of the peak current comparator 324. When the peak current threshold value on the second input 328 is exceeded by a measured current value received on the first input 326, an output of the peak current comparator 324 IPEAK 146 goes high. In response to IPEAK 146, switching will occur and the inductor 118 will begin to discharge, thereby acting as an inductor overcurrent protection during switching operation.

During non-switching operation (also referred to as "transparent" or "passthrough" operation), the passthrough enable signal EN_PT 142 is high. As a result, the first switch 320 and the second switch 322 couple the first and second inputs 326, 328 of the peak current comparator 324 to the first and second inputs 334, 336 of the error amplifier 332 respectively. The output 338 of the error amplifier 332 is provided as the signal IL2 149. During passthrough operation, the signal IL2 149 tracks a current through the inductor 118. The signal IL2 149 is received by the current comparison circuit 126, which is configured to provide the signal NOI 150 with a deactivated value when a current limit threshold is exceeded. The current limit threshold may be represented by the signal Ithresh 152. In some aspects, the current comparison circuit 126 comprises a comparator 340, where Ithresh and IL2 149 are received at first and second inputs of the comparator respectively, and the output of the comparator represents the signal NOI 150.

As previously described with reference to FIG. 2, when the signal NOI is provided (e.g., with a deactivated value), the signal WI_RANGE 139 is overridden by the logic circuit 128, and the signal EN_PT 142 goes low. The signal EN_PT 142 is received by the pulse generator 124, which causes the buck-boost converter 100 to operate in switching mode. The buck-boost converter 100 will perform switching operation based on IPEAK 146, and the inductor 118 will begin to discharge, thereby acting as inductor overcurrent protection.

Thus, the controller 122 is advantageously designed to include overcurrent protection during both switching and non-switching operation. During switching operation, the peak current comparator 324 provides inductor overcurrent protection. During non-switching operation, the current synthesis circuit 125 monitors the inductor current and provides it to the current comparison circuit 126 in the form of the signal IL2 149. The current comparison circuit 126 then detects inductor overcurrent by detecting when IL2 149 exceeds a current limit threshold represented by the signal Ithresh 152. In response, the signal EN_PT 142 goes low, causing the pulse generator 124 to resume switching operating, thereby acting as inductor overcurrent protection. In addition to facilitating inductor overcurrent protection during non-switching operation, since the signal IL2 149 tracks the inductor current during non-switching operation, the converter is always ready to return to switching operation with limited overshoot/undershoot, and can react very quickly to changes in Vin 136.

Figure 4A:
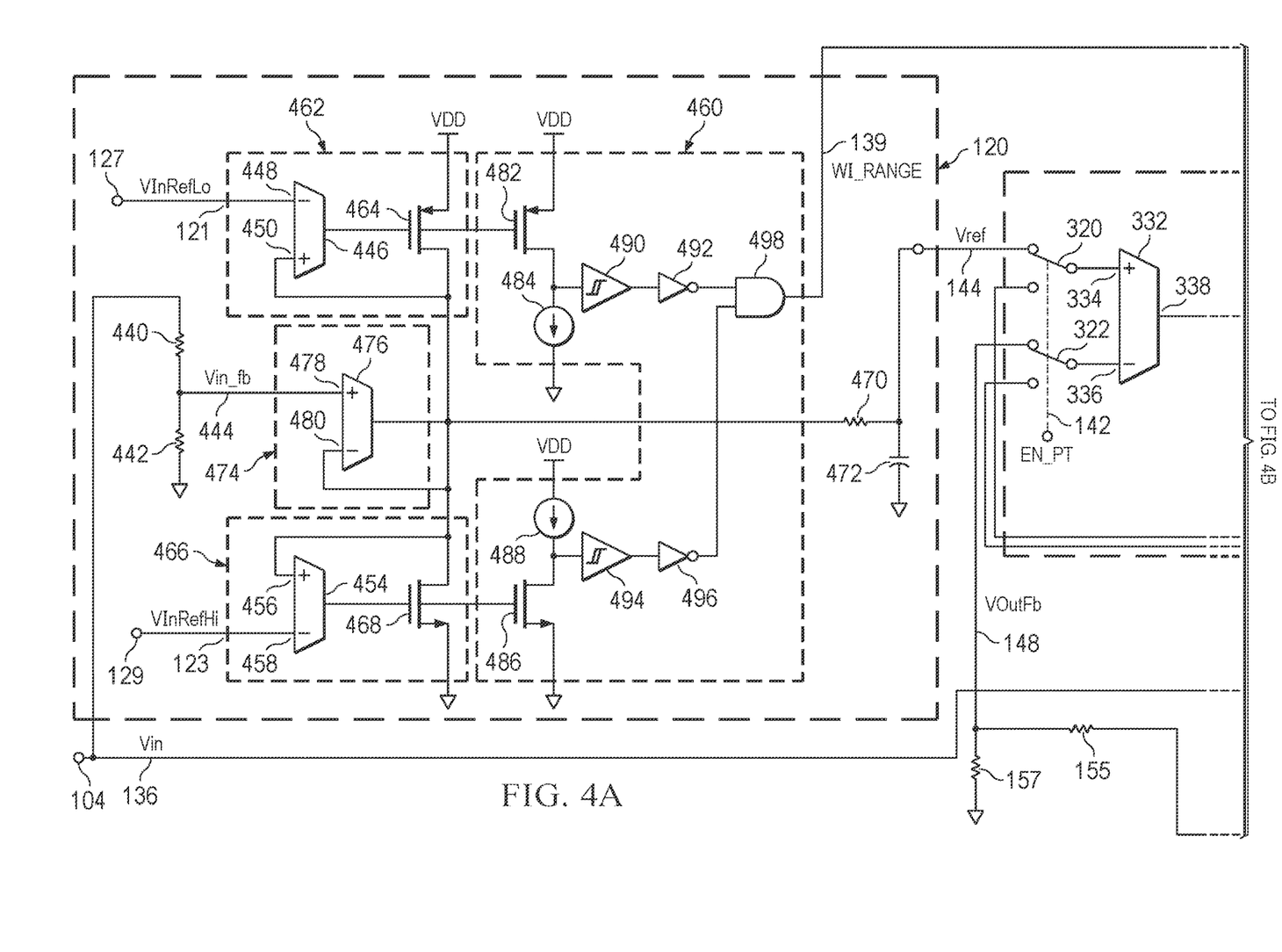
FIGS. 4A-4B are a circuit schematic including a DC-to-DC converter which has a pass-through mode with overcurrent protection in accordance with some aspects of the present disclosure.
Figure 4B:
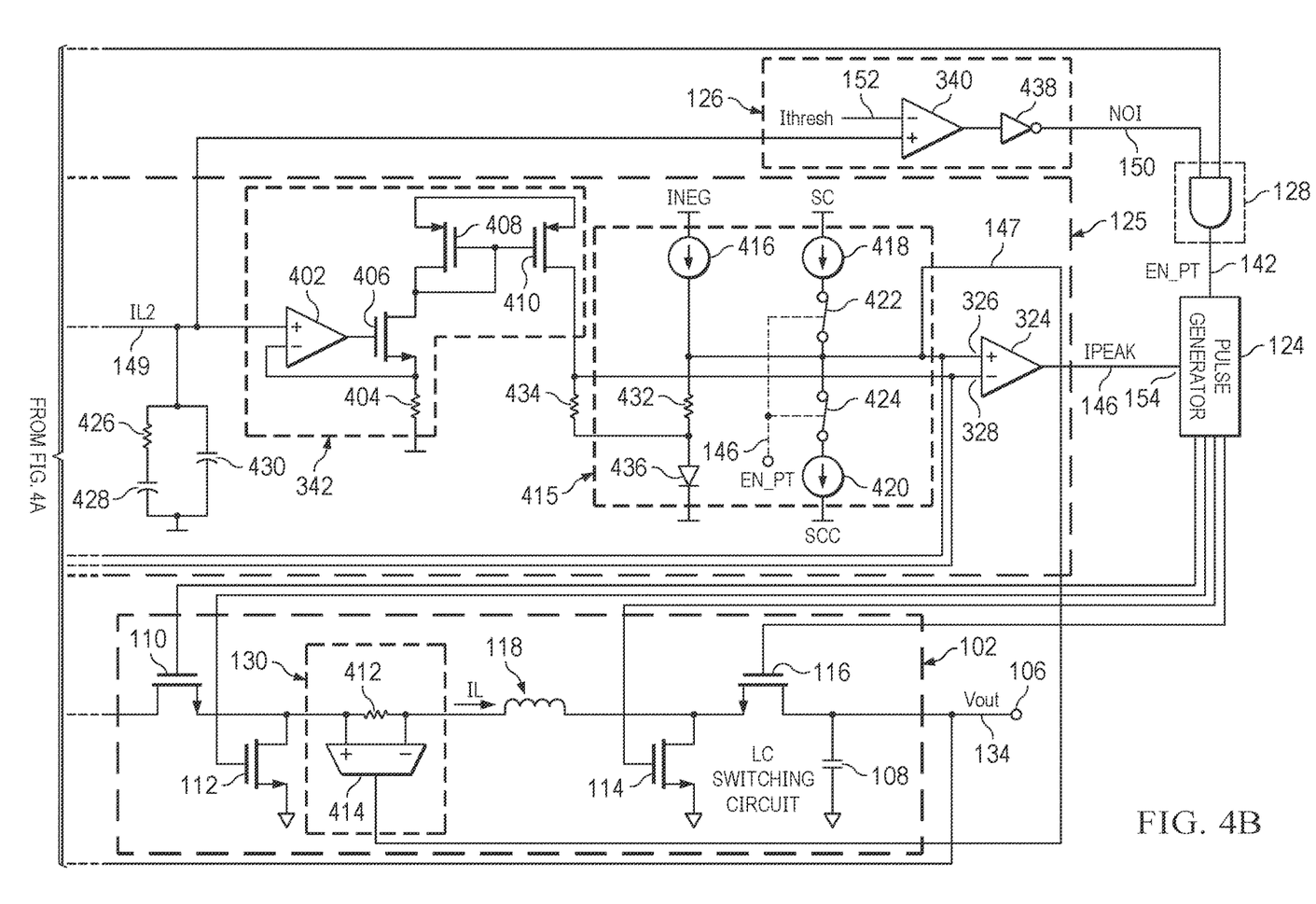

FIGS. 4A-4B shows a more detailed circuit schematic of a DC-DC converter in accordance with some aspects of the present disclosure. In this example, the DC-to-DC converter 100 again includes an input terminal 104 and output terminal 106, and an LC switching circuit 102 arranged between input terminal 104 and output terminal 106. The DC-to-DC converter 100 also includes a controller 122 (which includes a current synthesis circuit 125 and a pulse generator 124), an input voltage monitoring circuit 120, a current comparison circuit 126, and a logic circuit 128. It will be appreciated that the features and function described above with regards to FIG. 1 and FIG. 3 are still applicable to the DC-to-DC converter of FIGS. 4A-4B, but not all implementations falling within FIG. 1 and/or FIG. 3 are necessarily consistent with FIGS. 4A-4B.

In FIGS. 4A-4B, the input voltage monitoring circuit 120 includes a first voltage input terminal 127 upon which a low reference voltage VInRefLo 121 is received, a second voltage input terminal 129 upon which a high reference voltage VInRefHi 123 is received, and a third voltage input terminal 444 upon which an input feedback voltage VIN_FB is received. The input feedback voltage VIN_FB may be a feedback voltage based on the input voltage Vin 136 received at the input terminal 104 of the DC to DC converter 100. Resistors 440, 442 provide isolation between the input terminal 104 and feedback voltage input terminal 444.

The input voltage monitoring circuit 120 is configured to generate the within-range signal WI_RANGE 139 based on the low reference voltage VInRefLo 121, the input feedback voltage VIN_FB on 444, and the high reference voltage VInRefHi 123. In some aspects, the range between VInRefLo and VInRefHi defines an acceptable voltage range, where VInRefLo<VInRefHi. When VIN_FB is within the acceptable voltage range (e.g., VInRefLo<VIN_FB<VInRefHi), the input voltage monitoring circuit 120 is configured to output a value of 'true' or 'high' at a with-in range output terminal on which WI_RANGE 139 is provided, causing the LC switching circuit 102 to operate in pass-through mode. In contrast, when VIN_FB is outside of the acceptable voltage output range (e.g., VIN_FB<VInRefLo or VIN_FB>VInRefHi), the input voltage monitoring circuit 120 is configured to output a value of 'low' or 'false' at the with-in range output terminal. As a result, the LC switching circuit 102 operates in switching mode, and the output voltage Vout is regulated to stay within the acceptable output voltage range.

The input voltage monitoring circuit 120 further comprises a first comparator 446 comprising a first input 448 and a second input 450. The first input 448 of the first comparator 446 is coupled to the first voltage input terminal 127, and the second input 450 of the first comparator 446 is coupled to the feedback voltage input terminal 444. The input voltage monitoring circuit 120 further comprises a second comparator 454 comprising a first input 456 and a second input 458. The first input 456 of the second comparator 454 is coupled to the feedback voltage input terminal 444, and the second input 458 of the second comparator 454 is coupled to the second voltage input terminal 129. The input voltage monitoring circuit 120 further comprises a logic circuit 460, where an output of the first comparator 446 and an output of the second comparator 454 are coupled to first and second inputs of the logic circuit 460 respectively. The logic circuit 460 has an output coupled to a within-range output terminal, and is configured to output a value of 'true' or 'high' when VIN_FB is within the acceptable voltage output range or a value of 'false' or 'low' when VIN_FB is outside of the acceptable voltage output range, as described above. The output of the logic circuit 460 may be, for example, based on signals received on the first and second inputs of the logic circuit 460 from the first and second comparators respectively.

In some aspects, the first comparator 446 is part of a first voltage clamping circuit 462. The first voltage clamping circuit 462 further comprises current sourcing circuit 464, which comprises a control input coupled to the output of the first comparator 446 and a current sourcing output coupled to the feedback voltage input terminal 444. The first voltage clamping circuit 462 is configured to clamp VIN_FB to VInRefLo 121 when VIN_FB falls below VInRefLo 121. When VIN_FB falls below VInRefLo 121 (e.g., VIN_FB<VInRefLo121), the first comparator 446 outputs a value of 'low or 'false', which is received by the current sourcing circuit 464. In response, the current sourcing circuit 464 sources current in order to clamp VIN_FB to VInRefLo 121.

In some aspects, the second comparator 454 is part of a second voltage clamping circuit 466. The second voltage clamping circuit 466 further comprises current sinking circuitry 468, which comprises a control input coupled to the output of the second comparator 454 and a current sinking input coupled to the feedback voltage input terminal 444. The second voltage clamping circuit 466 is configured to clamp VIN_FB to VInRefHi when VIN_FB exceeds VInRefHi. When VIN_FB exceeds VInRefHi (e.g., VIN_FB>VInRefHi), the second comparator 454 outputs a value of 'high' or 'true', which is received by the current sinking circuitry 468. In response, the current sinking circuitry 468 sinks current in order to clamp VIN_FB to VInRefHi.

In some aspects, the input voltage monitoring circuit 120 further comprises a first resistor 470 and a first capacitor 472. In some examples, the first resistor 470 is referred to as a balancing resistor. The first resistor 470 is coupled between the feedback voltage input terminal 444 and a first voltage output terminal upon which the signal Vref 144 is provided. In some examples, the first voltage output terminal is referred to as a reference voltage output terminal. The first capacitor 472 is coupled to the first voltage output terminal. In pass-through mode (e.g., when no voltage clamping occurs) the first capacitor 472 is charged by VIN_FB through the first resistor 470, and Vref tracks VIN_FB. The voltage Vref may be used as a regulation target when overcurrent occurs. Using the previous example described with reference to FIG. 1, when the controller 122 resumes switching operation in response to inductor overcurrent, the output voltage can be regulated to the input voltage, since Vref tracks VIN_FB. The current synthesis circuit 125 further comprises decoupling circuitry 474. The decoupling circuitry 474 is configured to decouple the feedback voltage input terminal 444 from other components of the input voltage monitoring circuit 120. For example, an input of the decoupling circuitry 474 is coupled to the feedback voltage input terminal 444. An output of the decoupling circuitry 474 is coupled to the current sourcing output of the current sourcing circuit 464, the current sinking input of the current sinking circuitry 468, and the first resistor 470 as shown. In some aspects, the input voltage monitoring circuit 120 further comprises a logical inverter 492. An output of the logical inverter 492 is coupled to a with-in range output terminal upon which the signal WI_RANGE 139 is provided.

The input voltage monitoring circuit 120 includes logic circuit 460, first voltage clamping circuit 462, current sourcing circuit 464, second voltage clamping circuit 466, current sinking circuitry 468, decoupling circuitry 474, first resistor 470, and first capacitor 472.

In some aspects, the decoupling circuitry 474 includes a first amplifier 476 having a first input 478 coupled to the feedback voltage input terminal 444 and a second input 480.

In some aspects, the logic circuit 460 comprises a first logic transistor 482 having a first terminal coupled to the supply voltage VDD, a second terminal, and a control terminal coupled to the first input of the logic circuitry. A first current source 484 is coupled between the second terminal of the first logic transistor and ground. Alternatively, a resistor may be used in place of the first current source 484. The logic circuit 460 further comprises a second logic transistor 486 having a first terminal, a second terminal coupled to ground, and a control terminal coupled to the second input of the logic circuitry. A second current source 488 is coupled between the first terminal of the second logic transistor 486 and the supply voltage VDD. Similarly, a resistor may be used in place of the second current source 488.

In some aspects, the logic circuit 460 further comprises a first Schmitt trigger 490 having an input coupled to the second terminal of the first logic transistor 482 and an output. A NOT gate 492 has an input coupled to the output of the first Schmitt trigger 490 and an output. A second Schmitt trigger 494 has an input coupled to the first terminal of the second logic transistor 486 and an output. A buffer gate 496 has an input coupled to the output of the second Schmitt trigger 494 and an output. An AND-gate 498 has a first input coupled to the output of the NOT gate 492, a second input coupled to the output of the buffer gate 496, and an output coupled to the output of the logic circuit 460.

FIGS. 4A-4B further illustrate a controller 122, which includes a current synthesis circuit 125 and a pulse generator 124, in accordance with some aspects of the present disclosure. The controller includes peak current comparator 324, current sensor 130, error amplifier 332, level shifting circuit 342, correction circuitry 415, and current comparison circuit 126, which may be, for example, consistent with the LC switching circuit 102, peak current comparator 324, current sensor 130, error amplifier 332, level shifting circuit 342, and current comparison circuit 126 as described with reference to FIG. 1 and/or FIG. 3. Further, the controller 122 includes a peak current control output, first voltage input terminal, second voltage input terminal, and overcurrent detection output terminal.

In some aspects, the level shifting circuit 342 comprises a first amplifier 402, a first resistor 404, a first transistor 406, a second transistor 408, and a third transistor 410. The first amplifier 402 has a first input coupled to the output 338 of the error amplifier 332, a second input, and an output. The first resistor 404 is coupled to the second input of the first amplifier 402. The first transistor 406 has a first terminal, a second terminal coupled to the second input of the first amplifier 402, and a control terminal coupled to the output of the first amplifier 402. The first transistor 406 may be, for example, an N-channel metal-oxide-semiconductor (NMOS) transistor. The second transistor 408 has a first terminal, a second terminal coupled to the first terminal, and a control terminal coupled to the second terminal. The second transistor 408 may be, for example, a P-channel metal-oxide-semiconductor (PMOS) transistor. The third transistor 410 has a first terminal coupled to the first terminal of the second transistor 408, a second terminal coupled to the second input 328 of the peak current comparator 324, and a control terminal coupled to the control terminal of the second transistor 408. The third transistor 410 may be, for example, a PMOS transistor.

In some aspects, the current sensor 130 comprises a current sensing resistor 412 and a sensing amplifier 414. The current sensing resistor 412 is arranged in series with the inductor 118. The sensing amplifier 414 has first and second inputs coupled to first and second terminals of the current sensing resistor 412 respectively, and an output of the sensing amplifier 414 is coupled to an output of the current sensor 130.

In some aspects, the correction circuitry 415 comprises a negative current correction current source 416, an SC current source 418, an SC offset correction current source 420, a first correction switch 422, and a second correction switch 424, which are operably coupled as shown.

The negative current correction current source 416 may be configured to allow the 1 amplifier 414 may source or sink current, depending on the direction of the inductor current. In the negative inductor current scenario, the sensing amplifier 414 is sinking current, and the negative current correction current source 416 allows the net current going to the first input 326 of the peak current comparator 324 to be 0 A.

The SC current source 418 may be configured to perform slope compensation as part of the peak current control scheme. Further, the SC offset correction current source 420 may be configured to implement SC offset correction as part of the peak current control scheme. The SC current source 418 is coupled to the first input 326 of the peak current comparator 324 via a first correction switch 422, and the SC offset correction current source 420 is coupled to the first input 326 of the peak current comparator 324 via the second correction switch 424. Both SC and SC offset correction relate to reducing the effects of subharmonic oscillations, which typically arise during switching operation. Because SC and SC offset correction are not needed during pass-through operation, the correction circuitry may selectively decouple the SC current source 418 and the SC offset correction current source 420 from the first input 326 of the peak current comparator 324 accordingly. For example, the first and second correction switches 422, 424 are open when EN_PT is 1 and closed when EN_PT is 0.

In some aspects, the current synthesis circuit 125 further comprises a second resistor 426, a first capacitor 428, and a second capacitor 430. The second resistor 426 has a first terminal coupled to the output 338 and a second terminal. The first capacitor has a first terminal coupled to the output 338 and a second terminal. The second capacitor has a first terminal coupled to the second terminal of the second resistor 426 and a second terminal coupled to the second terminal of the second capacitor.

In some aspects, the current synthesis circuit 125 further comprises a third resistor 432, a fourth resistor 434, and a first diode 436. The third resistor 432 is coupled to the first input 326 of the peak current comparator 324. The fourth resistor 434 is coupled to the second input 328 of the peak current comparator 324. The first diode 436 has a first terminal coupled to the third and fourth resistors, such that the third and fourth resistors are coupled between the diode and the first and second inputs 326, 328 of the peak current comparator 324 respectively. Further, the first diode 436 has a second terminal coupled to ground.

In some aspects, the current comparison circuit 126 comprises comparator 340. The comparator 340 has a first input coupled to the current limit voltage threshold input terminal 153 and a second input coupled to the output 338. Further, the comparator 340 has an output coupled to the overcurrent detection output terminal. A logical inverter 438 (e.g., a NOT gate) is coupled between the output of the comparator and the overcurrent detection output terminal.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases.

In some examples, the methods described above may be implemented in a computer readable medium using instructions stored in a memory.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of that parameter. Modifications are possible in the described examples, and other implementations are possible, within the scope of the claims.

What is claimed is:

1. A DC-DC converter controller, comprising:
   an input terminal;
   an output terminal;
   a current path extending from the input terminal to the output terminal;
   an input voltage monitoring circuit having an input voltage monitoring circuit input, an upper input voltage threshold terminal, a lower input voltage threshold terminal, and a voltage reference output, the input voltage monitoring circuit input coupled to the input terminal;
   a controller having a feedback input, a reference input, and a plurality of switching outputs, wherein the feedback input is coupled to the output terminal and the reference input is coupled to the voltage reference output of the input voltage monitoring circuit;
   a current sensor having a current sensor input arranged on the current path and a current sensor output; and
   a current comparison circuit having a first current comparison input, a second current comparison input, and a current comparison output, the first current comparison input coupled to the current sensor output, the second current comparison input coupled to a current threshold terminal, and the current comparison output coupled to the controller.

2. The DC-DC converter controller of claim 1, further comprising:
   a logic circuit having a first logic input, a second logic input, and a logic output, the first logic input coupled to the current comparison output, the second logic input coupled to a signal output of the input voltage monitoring circuit, and the logic output coupled to the controller.

3. The DC-DC converter controller of claim 1, wherein the input voltage monitoring circuit comprises:
   an input voltage comparator having a first comparator input, second comparator input, and a comparator output, the first comparator input coupled to the input terminal, and the second comparator input coupled to the comparator output and coupled to the voltage reference output;
   an upper voltage clamping circuit configured to clamp the voltage reference output to the upper input voltage threshold terminal when an input voltage on the input terminal is greater than an upper voltage threshold on the upper input voltage threshold terminal; and
   a lower voltage clamping circuit configured to clamp the voltage reference output to the lower input voltage threshold terminal when the input voltage on the input terminal is less than a lower voltage threshold on the lower input voltage threshold terminal.

4. The DC-DC converter controller of claim 1, wherein the input voltage monitoring circuit is configured to provide a signal indicating an input voltage on the input terminal is within a predetermined voltage range.

5. The DC-DC converter controller of claim 4, wherein the current comparison circuit is configured to provide an overcurrent signal based on a measured current signal from the current sensor, and wherein the controller is configured to set the plurality of switching outputs based on the overcurrent signal to divert current from the current path to ground.

6. The DC-DC converter controller of claim 5, further comprising:
a logic circuit having a first logic input, a second logic input, and a logic output;
wherein the first logic input is coupled to the input voltage monitoring circuit and configured to receive the signal indicating the input voltage on the input terminal is within the predetermined voltage range, the second logic input is coupled to the current comparison circuit and configured to receive the overcurrent signal, and the logic output is coupled to the controller.

7. The DC-DC converter controller of claim 6, wherein the input voltage monitoring circuit is further configured to clamp the voltage reference output to the lower input voltage threshold terminal when the input voltage is less than an lower voltage threshold on the lower input voltage threshold terminal, and further configured to clamp the voltage reference output to the upper input voltage threshold terminal when the input voltage is greater than an upper voltage threshold on the upper input voltage threshold terminal.

8. A circuit, comprising:
a first voltage input terminal;
a second voltage input terminal;
a first control input terminal;
a signal output terminal;
a first switch, comprising:
a first input coupled to the first voltage input terminal;
a second input;
an output; and
a control terminal coupled to the first control input terminal;
a second switch, comprising:
a first input coupled to the second voltage input terminal;
a second input;
an output; and
a control terminal coupled to the first control input terminal;
an error amplifier, comprising:
a first input coupled to the output of the first switch;
a second input coupled to the output of the second switch; and
an output coupled to the signal output terminal;
a peak current comparator comprising:
a first input;
a second input coupled to the output of the error amplifier; and
an output;
wherein the second input of the first switch is coupled to the first input of the peak current comparator; and
wherein the second input of the second switch is coupled to the second input of the peak current comparator.

9. The circuit of claim 8, further comprising:
a LC switching circuit comprising an inductor; and
a current sensor arranged in series with the inductor;
wherein an output of the current sensor is coupled to the first input of the peak current comparator.

10. The circuit of claim 9, further comprising:
overcurrent protection circuitry coupled to the signal output terminal;
wherein the overcurrent protection circuitry is configured to limit a current through the inductor when a voltage of the signal output terminal exceeds a current limit voltage threshold value.

11. The circuit of claim 9, wherein the current sensor comprises:
a current sensing resistor arranged in series with the inductor; and
a sensing amplifier having first and second inputs coupled to first and second terminals of the current sensing resistor respectively, and an output coupled to the output of the current sensor;
wherein the LC switching circuit comprises:
a first switch having a first terminal coupled to a voltage input and a second terminal coupled to the first terminal of the current sensing resistor;
a second switch having a first terminal coupled to the first terminal of the current sensing resistor and as second terminal coupled to ground;
a third switch having a first terminal coupled to the inductor and a second terminal coupled to ground; and
a fourth switch having a first terminal coupled to the inductor and a second terminal coupled to a voltage output.

12. The circuit of claim 8, wherein the output of the error amplifier is coupled to the second input of the peak current comparator via level shifting circuitry, the level shifting circuitry comprising:
a first amplifier having a first input coupled to the output of the error amplifier, a second input, and an output;
a first resistor coupled to the second input of the first amplifier;
a first transistor having a first terminal, a second terminal coupled to the second input of the first amplifier, and a control terminal coupled to the output of the first amplifier;
a second transistor having a first terminal, a second terminal coupled to the first terminal of the first transistor, and a control terminal coupled to the second terminal; and
a third transistor having a first terminal coupled to the first terminal of the second transistor, a second terminal coupled to the second input of the peak current comparator, and a control terminal coupled to the control terminal of the second transistor.

13. The circuit of claim 8, further comprising:
a second resistor having a first terminal coupled to the signal output terminal and a second terminal;
a first capacitor having a first terminal coupled to the signal output terminal and a second terminal; and
a second capacitor having a first terminal coupled to the second terminal of the second resistor and a second terminal;
wherein the second terminal of the first capacitor is coupled to the second terminal of the second capacitor.

14. The circuit of claim 8, further comprising:
correction circuitry coupled to the first input of the peak current comparator, the correction circuitry comprising:
a slope compensation (SC) current source;
an SC offset correction current source;

a negative current correction current source having an output coupled to the first input of the peak current comparator;

a first correction switch coupled between an output of the SC current source and the first input of the peak current comparator; and a second correction switch coupled between the output of the SC offset correction current source and the first input of the peak current comparator;

a third resistor coupled to the first input of the peak current comparator;

a fourth resistor coupled to the second input of the peak current comparator; and a first diode having a first terminal coupled to the third and fourth resistors, and a second terminal coupled to ground;

wherein control terminals of the first and second correction switches are coupled to the first control input terminal.

15. A circuit, comprising:

a first voltage input terminal;

a second voltage input terminal;

a third voltage input terminal;

a first voltage output terminal;

a first resistor coupled between the third voltage input terminal and the first voltage output terminal;

a first comparator having a first input coupled to the first voltage input terminal, a second input coupled to the third voltage input terminal, and an output;

current sourcing circuitry having a control input coupled to the output of the first comparator, and a current sourcing output coupled to the third voltage input terminal;

a second comparator having a first input coupled to the third voltage input terminal, a second input coupled to the second voltage input terminal, and an output;

current sinking circuitry having a control input coupled to the output of the second comparator, and a current sinking input coupled to the third voltage input terminal; and logic circuitry having a first input coupled to the output of the first comparator, a second input coupled to the output of the second comparator, and a within-range output.

16. The circuit of claim 15, further comprising: a first capacitor coupled to the first voltage output terminal.

17. The circuit of claim 15, wherein the current sourcing circuitry comprises a current sourcing transistor having a first terminal coupled to a supply voltage, a second terminal coupled to the current sourcing output, and a control terminal coupled to the control input of the current sourcing circuitry; and wherein the current sinking circuitry comprises a current sinking transistor having a first terminal coupled to the current sinking input, a second terminal coupled to ground, and a control terminal coupled to the control input of the current sinking circuitry.

18. The circuit of claim 15, wherein the logic circuitry comprises:

a first logic transistor having a first terminal coupled to a supply voltage, a second terminal, and a control terminal coupled to the first input of the logic circuitry;

a first logic resistor coupled to the second terminal of the first logic transistor;

a second logic transistor having a first terminal, a second terminal coupled to ground, and a control terminal coupled to the second input of the logic circuitry; and a second logic resistor coupled between the first terminal of the second logic transistor and the supply voltage.

19. The circuit of claim 18, wherein the logic circuitry further comprises:

a first Schmitt trigger having an input coupled to the second terminal of the first logic transistor and an output;

a NOT gate having an input coupled to the output of the first Schmitt trigger and an output;

a second Schmitt trigger having an input coupled to the first terminal of the second logic transistor and an output;

a buffer gate having an input coupled to the output of the second Schmitt trigger and an output; and an AND gate having a first input coupled to the output of the NOT gate, a second input coupled to the output of the buffer gate, and an output coupled to the within-range output.

20. The circuit of claim 15, further comprising:

a first amplifier having a first input coupled to the third voltage input terminal, a second input, and an output coupled to the first resistor;

wherein the second input of the first amplifier is coupled to the output of the first amplifier.

* * * * *